United States Patent [19]

Breed et al.

[11] Patent Number: 5,419,585
[45] Date of Patent: May 30, 1995

[54] RETROFIT VEHICULAR STEERING WHEEL ASSEMBLY HAVING AN AIR BAG ASSEMBLY

[75] Inventors: Allen Breed, So. Padre Island, Tex.; Ted Thuen, Lakeland; Russel Brantman, Tampa, both of Fla.; William O. Textores, Upper Montclair, N.J.

[73] Assignee: Breed Automotive Technology, Inc., Lakeland, Fla.

[21] Appl. No.: 227,112

[22] Filed: Apr. 13, 1994

[51] Int. Cl.6 ............................................. B60R 21/16
[52] U.S. Cl. ............................. 280/731; 280/728.2
[58] Field of Search ............... 280/728 R, 731, 728 A, 280/750, 735, 734

[56] References Cited

U.S. PATENT DOCUMENTS

| | | | |
|---|---|---|---|
| 4,899,613 | 2/1990 | Kawaguchi | 280/731 X |
| 5,085,461 | 2/1992 | Shibata | 280/731 |
| 5,303,952 | 4/1994 | Shermetaro et al. | 280/731 |
| 5,348,340 | 9/1994 | Humphreys et al. | 280/728 A |

FOREIGN PATENT DOCUMENTS

| | | | |
|---|---|---|---|
| 0551732 | 7/1993 | European Pat. Off. | 280/731 |
| 1014601 | 10/1991 | WIPO | 280/731 |

*Primary Examiner*—Mitchell J. Hill
*Assistant Examiner*—Christopher P. Ellis
*Attorney, Agent, or Firm*—Kane, Dalsimer, Sullivan, Kurucz, Levy, Eisele & Richard

[57] ABSTRACT

A retrofit steering wheel assembly having an air bag assembly comprises an armature including a casting and an insert in the casting for coupling with a steering wheel column, with different inserts being used for different columns peculiar to different model vehicles. An inflator adapter is coupled with the casting and adapted to mount an inflator and has a hole to receive a pin of an air bag module, the adapter defining with the casting an opening through which surfaces of the inflator are adapted to travel to mount the inflator and arm a sensor. A biased arm closes the hole and is adapted to be moved to an open position at which the pin is adapted to penetrate the hole only when the inflator is properly mounted. An inflator having a radially extending lug adapted to engage the biased arm to move the arm to permit the pin to penetrate the hole to anchor the inflator in its properly mounted position.

33 Claims, 4 Drawing Sheets

RETROFIT VEHICULAR STEERING WHEEL ASSEMBLY HAVING AN AIR BAG ASSEMBLY

BACKGROUND OF THE INVENTION

Vehicular driver side air bag assemblies have proven successful and have gained commercial acceptance. Today, a driver side air bag assembly is installed as original equipment in many styles and makes of vehicles. However, many vehicles both new and old are being driven without the driver protection of an air bag assembly. Accordingly, there exists a need for an air bag assembly that may be installed on existing vehicles that do not possess a driver side air bag assembly.

SUMMARY OF THE INVENTION

A principal object of the present invention is to provide a retrofit steering wheel assembly having an air bag assembly.

Another object is to provide a retrofit steering wheel assembly of the foregoing type that may replace the steering wheel of practically all makes and styles of vehicles.

A further object is to provide a retrofit steering wheel assembly of the foregoing type that adopts a time proven inflator and sensor that utilizes a unique arming mechanism that will prevent the air bag from being mounted on the steering wheel unless the sensor is armed.

Other objects and advantages will become apparent from the following detailed description which is to be taken in conjunction with the accompanying drawings.

DETAILED DESCRIPTION OF THE PREFERRED EMBODIMENTS

Figure 1:
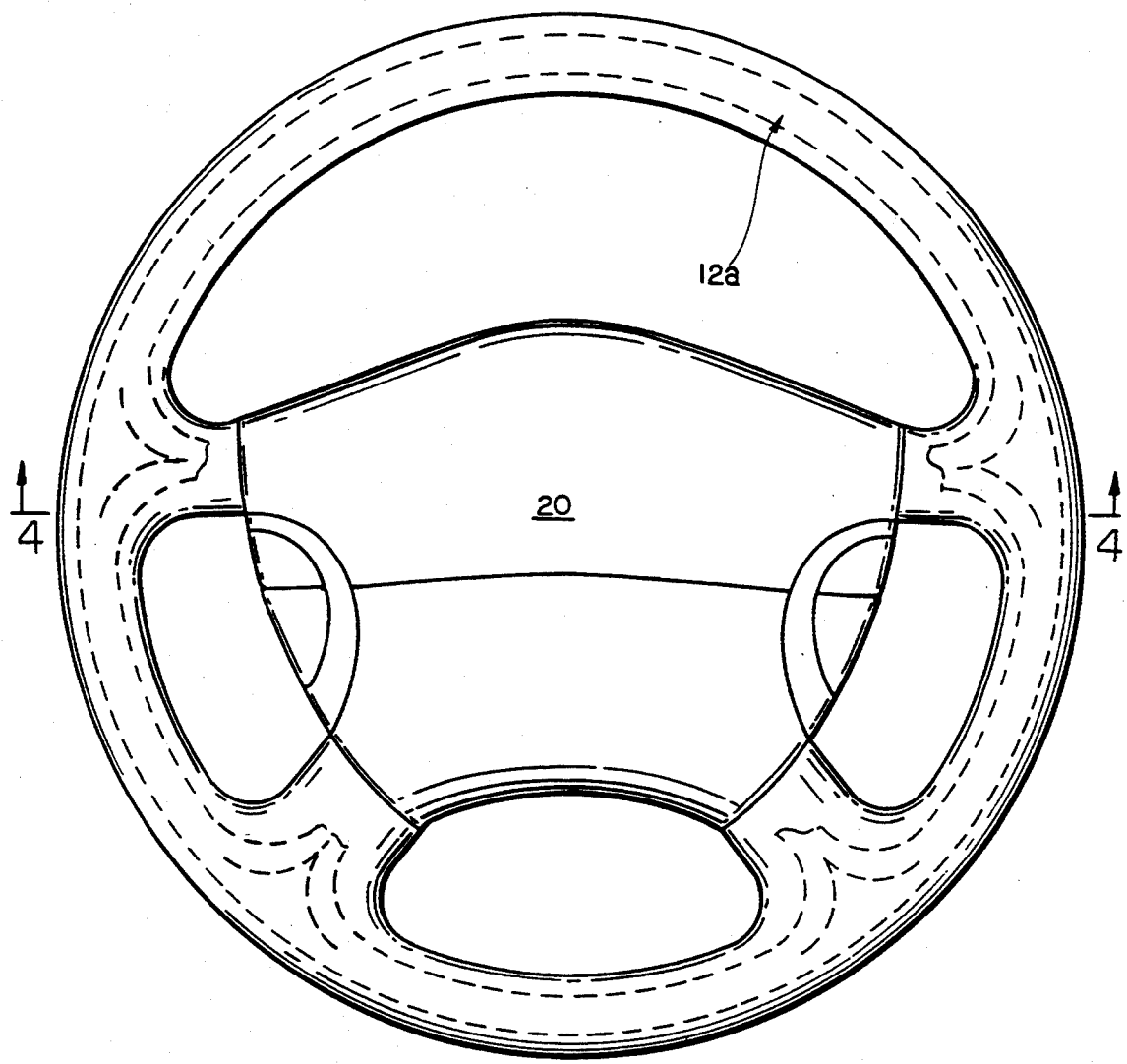
FIG. 1 is a plan view of a retrofit steering wheel assembly of the present invention having an air bag assembly.
Figure 2:
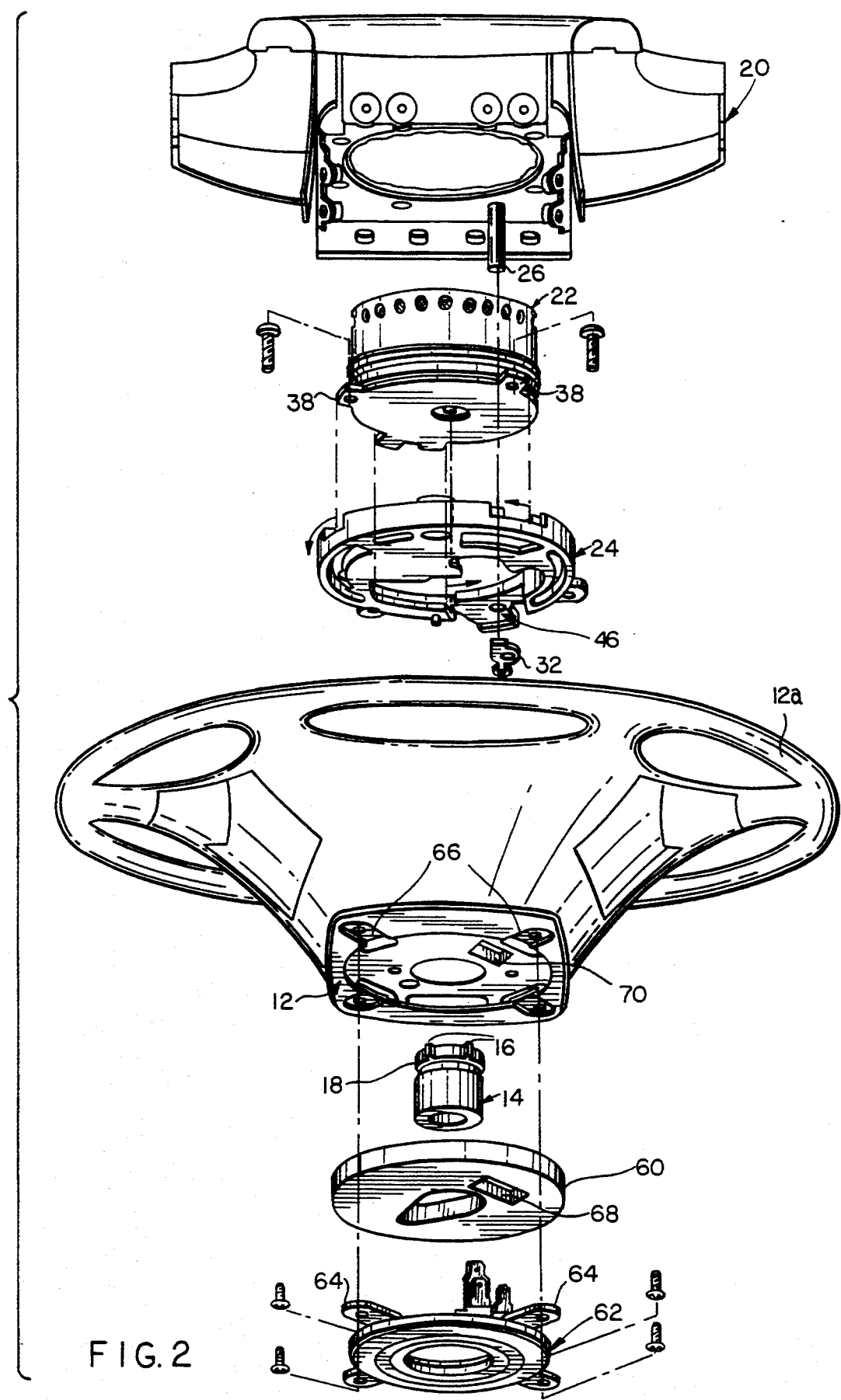
FIG. 2 is an exploded perspective view of the steering wheel assembly and air bag assembly.

Referring initially to FIG. 2, a retrofit steering wheel assembly 10 of this invention includes a die cast armature 12 which in accordance with a successful embodiment may be magnesium aluminum alloy. The armature 12 is cast about an insert 14 which will differ with each make and model car because of the different size and configured steering column shafts. In order to anchor the insert 14, radially extending lugs 16 and circumferentially extending slot and shelf 18 are provided and embedded within the casting. After the casting and anchoring of the insert 14, the armature is covered to form the steering wheel 12a.

The air bag module 20 and inflator 22 are mounted on the armature 12 by adapter 24. As will be understood by those skilled in the art, the module 20 will normally include a cover, bug and backing plate from which extends pin 26 the purpose of which will be described in detail shortly. The adapter 24 is suitably bolted to the armature 12 and is provided with a through hole 30 that will receive pin 26 only when the internally mounted sensor of inflator 22 is properly armed. Mounted on the underside of the adapter 24 is a spring biased pivotal arm 32 having a through hole 34 which will align with hole 30 of adapter 24 when the arming takes place so that pin 26 can be received by both holes 34 and 30. Otherwise arm 32 will cover hole 30 so that pin 26 will not penetrate the holes fully.

The inflator 22 and internally mounted sensor is of the type disclosed in detail in commonly assigned U.S. Patent Application Ser. No. 08/008,689 filed Jan. 25, 1993, now U.S. Pat. No. 5,348,340, and sensor arming is of the type disclosed in U.S. Pat. No. 5,197,751 granted Mar. 30, 1993 through the use of "D" shafts 36 on the adapter 24. A pair of radially extending bored arms 38 serve to facilitate the bolting of the inflator 22 to the adapter 24. In addition, a radially extending beveled camming lug 40 is on the inflator housing and cooperates with the adapter 24 and arm 32 in arming the sensor and aligning holes 30 and 34. In this regard, the adaptor 24 is formed with a slot 42 that conveniently receives lug 40 and an annular flange 44, spaced outwardly from the main body of the adaptor 24 to define an annular opening 46 that advantageously receives the lug 40 and also contains the pivotal arm 32. When the lug 40 is placed in the slot 42 the sensor is unarmed and the pin 26 can only enter hole 30 but not hole 34. In order to arm the inflator 22 is turned clockwise to move the lug 40 into opening 46 under flange 44. Camming face 48 of lug 40 engages arm 32 and with continued turning of the inflator 22 camming face 48 will cause arm 32 to pivot counter clockwise to ultimately align hole 34 with hole 30; and at which moment, the trailing locking edge 50 of the lug 40 will enter notch 52 of the arm 32 to latch the arm 32 and sensor in its armed position as described in detail in the above referenced patent. With the holes 30 and 34 aligned, the pin can enter these openings to permit securement of the module 20 to the adapter.

Figure 3:
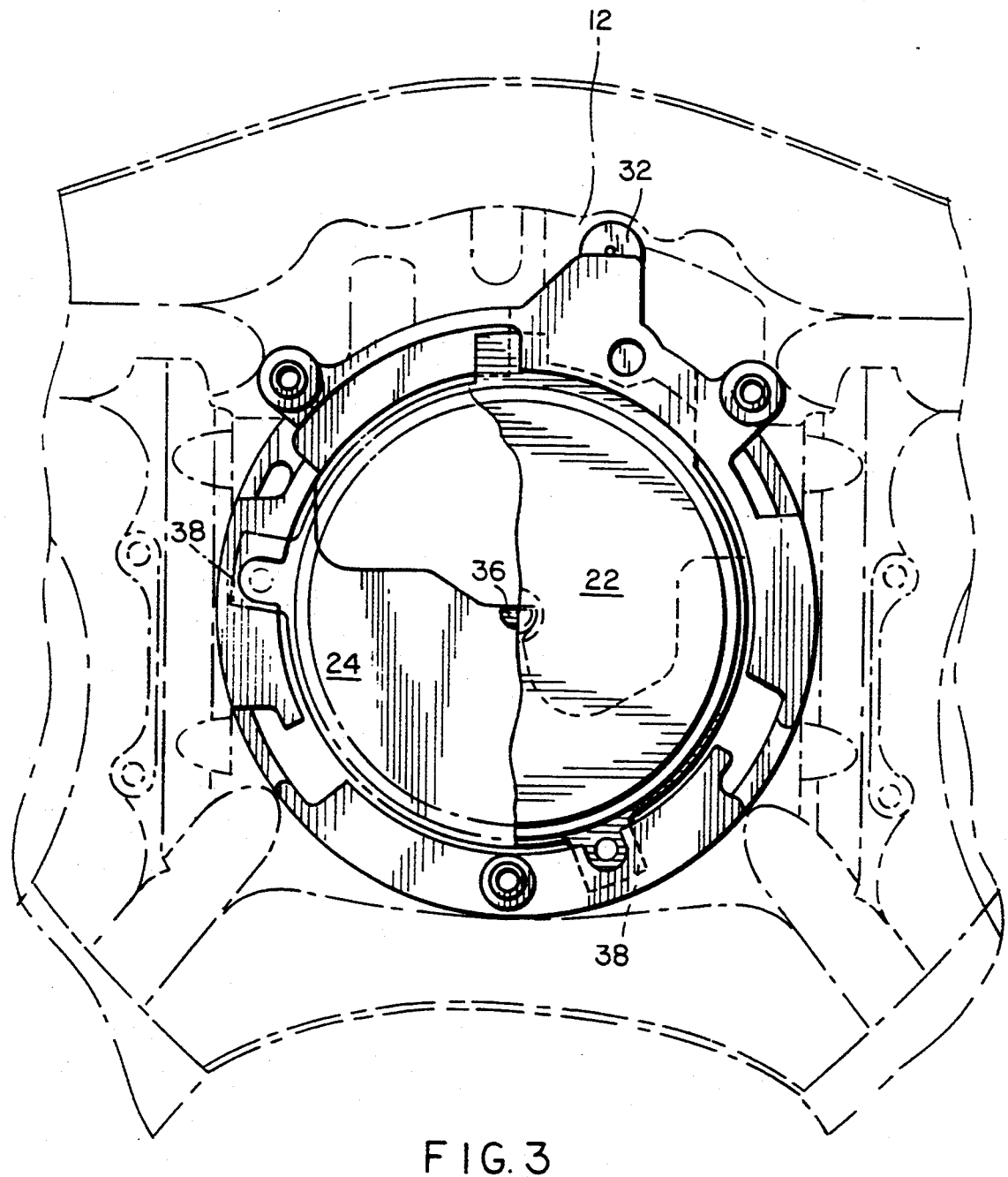
FIG. 3 is an enlarged plan view of the inflator with certain parts broken away and removed and the armature shown in phantom.
Figure 4:
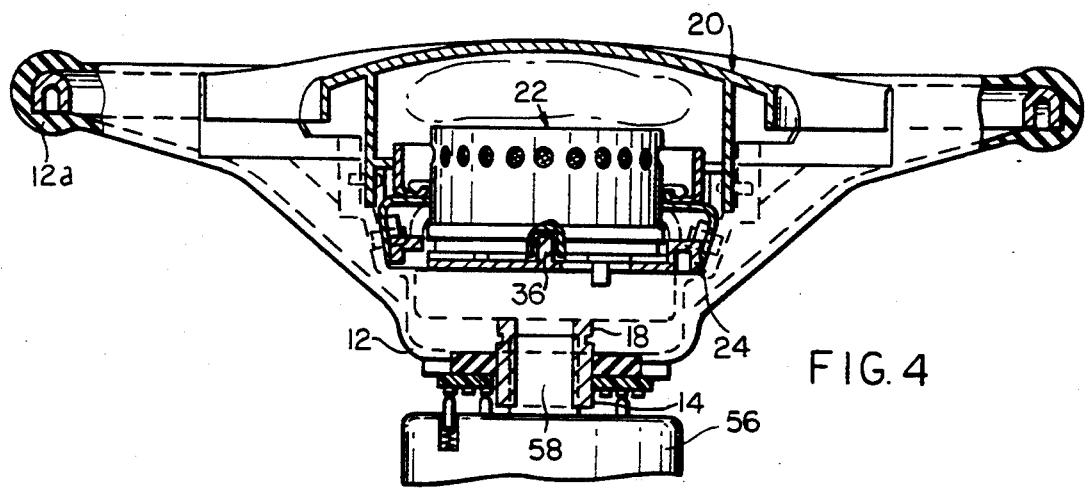
FIG. 4 is a cross sectional view taken along the line 4—4 of FIG. 1.
Figures 5, 6:
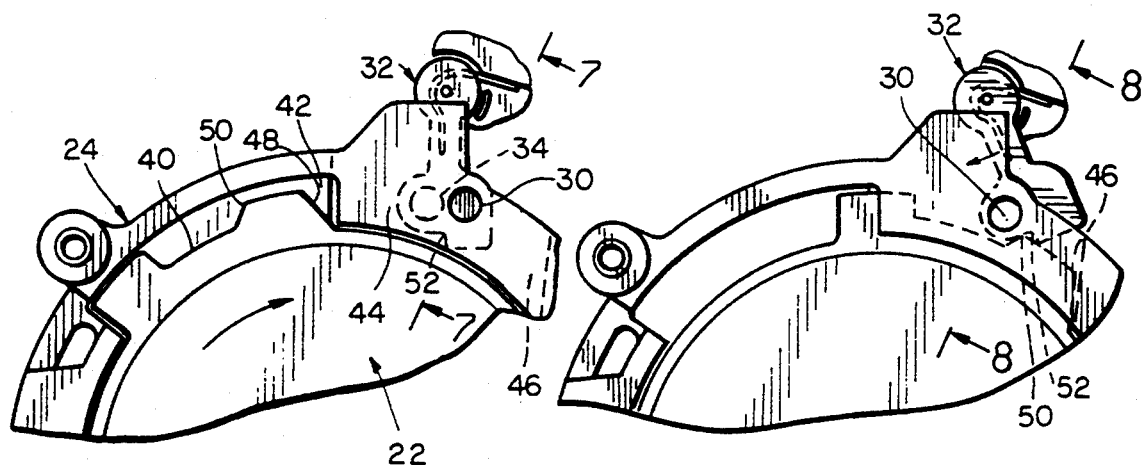
FIG. 5 is an enlarged fragmentary view of the inflator and adapter prior to arming.
FIG. 6 is a similar view after arming.
Figure 7:
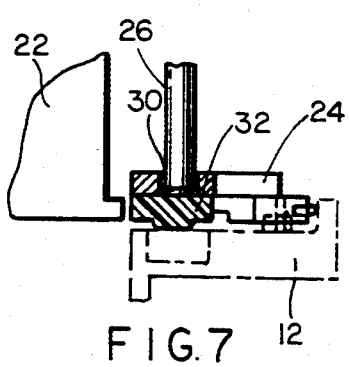
FIG. 7 is a cross sectional view taken along the line 7—7 of FIG. 5 showing how the mounting pin of the air bag is precluded from being inserted throughout the adapter.
Figure 8:
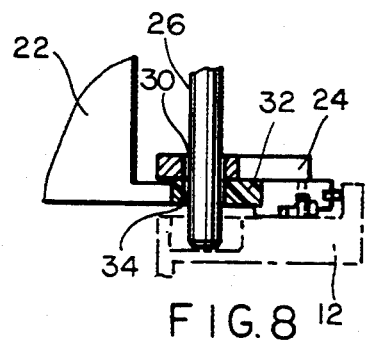
FIG. 8 is a cross sectional view taken along the line 8—8 of FIG. 6 showing the mounting pin of the air bag being received in the accommodating hole of the adapter after the sensor has been armed.

In securing the steering wheel 12a to the steering column 56 (see FIG. 3), the insert 14 is anchored to the steering shaft 58 by a pin or other well known means. An insulating plate or pad 60 is interposed between the base of the armature 12 and the slip ring 62 which will differ with the make of the car. Brushes 64 on the steering column will engage with the slip ring 62. The arms 64 of the slip ring 62 will be received in accommodating recesses 66 in the base of the armature and will be suitably bolted thereto to anchor the slip ring in place with the interposed pad 60. The opening 68 in the plate 60 and opening 70 in the base of the armature 12 permits electrical connection with the horn and cruise control, if present.

Thus, the several forenoted objects and advantages are most effectively attained. Although a single somewhat preferred embodiment has been disclosed and described in detail herein, it should be understood that this invention is in no sense limited thereby and its scope is to be determined by that of the appended claims.

We claim:

1. A retrofit steering wheel assembly having an air bag assembly for replacing a steering wheel assembly of a vehicle without an air bag assembly comprising:

an armature including a casting possessing a periphery defining the general outline of a steering wheel and about which a cover is added to form the wheel, an insert for coupling with a steering wheel column, with different inserts being used for different columns peculiar to different model vehicles, the casting being cast about the insert;

an inflator adapter coupled with the casting and adapted to mount an inflator, the inflator adapter having a hole therein adapted to receive a pin of an air bag module, the adapter defining with the casting an opening through which surfaces of the inflator are adapted to travel while mounting the inflator;

a biased arm biased to a closed position closing the hole and operating to prevent the pin of the air bag module to penetrate through the hole when the inflator is other than properly mounted in the adapter and adapted to be moved to an open position at which the pin is adapted to penetrate the hole only when the inflator is properly mounted;

an inflator having a radially extending lug and means for coupling the inflator to the adapter when the inflator is properly mounted, the arm defining the surfaces that travel through the opening track, the radially extending lug on the inflator being adapted to engage the biased arm to move the arm from a closed position to an open position during said travel to place the inflator in a properly mounted position and to permit the pin to penetrate the hole to anchor the inflator in its properly mounted position.

2. The invention in accordance with claim 1 wherein an air bag module having a folded air bag and cover and backing plate therefor, is coupled with the casting about the inflator.

3. The invention in accordance with claim 1 wherein the insert has a coaxial bore for receiving surfaces of the steering wheel column and at least one radial lug and circumferentially extending shelf for anchoring the insert in the casting.

4. The invention in accordance with claim 1 wherein a sensor is mounted carefully within the inflator and the inflator adapter includes a D-shaft for cooperating in arming the sensor when the inflator is properly mounted.

5. The invention in accordance with claim 1 wherein the biased arm is mounted on the casting, a spring biasing the biased arm to its closed position, the arm being interposed between the inflator adapter and casting.

6. The invention in accordance with claim 1 wherein latching means including surfaces of the arm and lug cooperate to latch the inflator in its properly mounted position.

7. The invention in accordance with claim 1 wherein the radially extending arm includes a hole adapted to be aligned with the hole in the inflator adapter when the biased arm in its open position whereupon the pin of the air bag module is adapted to penetrate the hole in the inflator arm and the adapter to lock the inflator in its properly mounted position to the adapter and consequently the wheel.

8. The invention in accordance with claim i wherein the armature includes an opening for receiving therethrough electrical wiring from the wheel column.

9. The invention in accordance with claim 1 wherein means are provided on the armature for coupling with cruise control of the model vehicle.

10. The invention in accordance with claim 1 wherein a slip ring is mounted on the armature for coupling with brush means on the column for bringing electrical current from the vehicle to the horn and cruise control of the vehicle.

11. The invention in accordance with claim 1 wherein means are provided on the adapter for arming a sensor in the inflator upon turning the inflator to its properly mounted position.

12. A retrofit steering wheel assembly having an air bag assembly for replacing a steering wheel assembly of a vehicle without an air bag assembly comprising:

an armature including a casting possessing a periphery defining the general outline of a steering wheel and about which a cover is added to form the wheel, means for coupling with a steering wheel column;

an inflator adapter coupled with the casting and adapted to mount an inflator, the inflator adapter having a hole therein adapted to receive a pin of an air bag module, the adapter defining with the casting an opening through which surfaces of the inflator are adapted to travel while mounting the inflator;

a biased arm biased to a closed position closing the hole and operating to prevent the pin of the air bag module to penetrate through the hole when the inflator is other than properly mounted in the adapter and adapted to be moved to an open position at which the pin is adapted to penetrate the hole only when the inflator is properly mounted;

an inflator having a radially extending lug and means for coupling the inflator to the adapter when the inflator is properly mounted, the arm defining the surfaces that travel through the opening track, the radially extending lug on the inflator being adapted to engage the biased arm to move the arm from a closed position to an open position during said travel to place the inflator in a properly mounted position and to permit the pin to penetrate the hole to anchor the inflator in its properly mounted position.

13. The invention in accordance with claim 12 wherein an air bag module having a folded air bag and cover and backing plate therefor, is coupled with the casting about the inflator.

14. The invention in accordance with claim 12 wherein a sensor is mounted carefully within the inflator and the inflator adapter includes a D-shaft for cooperating in arming the sensor when the inflator is properly mounted.

15. The invention in accordance with claim 12 wherein the biased arm is mounted on the casting, a spring biasing the biased arm to its closed position, the arm being interposed between the inflator adapter and casting.

16. The invention in accordance with claim 12 wherein latching means including surfaces of the arm and lug cooperate to latch the inflator in its properly mounted position.

17. The invention in accordance with claim 12 wherein the radially extending arm includes a hole adapted to be aligned with the hole in the inflator adapter when the biased arm in its open position whereupon the pin of the air bag module is adapted to penetrate the hole in the inflator arm and the adapter to lock the inflator in its properly mounted position to the adapter and consequently the wheel.

18. The invention in accordance with claim 12 wherein the armature includes an opening for receiving therethrough electrical wiring from the wheel column.

19. The invention in accordance with claim 12 wherein means are provided on the armature for coupling with cruise control of the model vehicle.

20. The invention in accordance with claim 12 wherein a slip ring is mounted on the armature for coupling with brush means on the column for bringing electrical current from the vehicle to the horn and cruise control of the vehicle.

21. The invention in accordance with claim 12 wherein means are provided on the adapter for arming a sensor in the inflator upon turning the inflator to its properly mounted position.

22. A retrofit steering wheel assembly having an air bag assembly for replacing a steering wheel assembly of a vehicle without an air bag assembly comprising:

an armature including a casting possessing a periphery defining the general outline of a steering wheel and about which a cover is added to form the wheel, an insert for coupling with a steering wheel column, with different inserts being used for different columns peculiar to different model vehicles, the casting being cast about the insert;

a mounting means coupled with the casting and adapted to mount an inflator, the mounting means having a hole therein adapted to receive a pin of an air bag module, the mounting means defining with the casting an opening through which surfaces of the inflator are adapted to travel while mounting the inflator;

a biased arm biased to a closed position closing the hole and operating to prevent the pin of the air bag module to penetrate through the hole when the inflator is other than properly mounted by the mounting means and adapted to be moved to an open position at which the pin is adapted to penetrate the hole only when the inflator is properly mounted;

an inflator having a radially extending lug and means for coupling the inflator with the mounting means when the inflator is properly mounted, the arm defining the surfaces that travel through the opening track, the radially extending lug on the inflator being adapted to engage the biased arm to move the arm from a closed position to an open position during said travel to place the inflator in a properly mounted position and to permit the pin to penetrate the hole to anchor the inflator in its properly mounted position.

23. The invention in accordance with claim 2 wherein an air bag module having a folded air bag and cover and backing plate therefor, is coupled with the casting about the inflator.

24. The invention in accordance with claim 22 wherein the insert has a coaxial bore for receiving surfaces of the steering wheel column and at least one radial lug and circumferentially extending shelf for anchoring the insert in the casting.

25. The invention in accordance with claim 22 wherein a sensor is mounted carefully within the inflator and the mounting means includes a D-shaft for cooperating in arming the sensor when the inflator is properly mounted.

26. The invention in accordance with claim 22 wherein the biased arm is mounted on the casting, a spring biasing the biased arm to its closed position, the arm being interposed between the inflator adapter and casting.

27. The invention in accordance with claim 22 wherein latching means including surfaces of the arm and lug cooperate to latch the inflator in its properly mounted position.

28. The invention in accordance with claim 22 wherein the radially extending arm includes a hole adapted to be aligned with the hole in the mounting means when the biased arm in its open position whereupon the pin of the air bag module is adapted to penetrate the hole in the inflator arm and the mounting means to lock the inflator in its properly mounted position to the adapter and consequently the wheel.

29. The invention in accordance with claim 22 wherein the armature includes an opening for receiving therethrough electrical wiring from the wheel column.

30. The invention in accordance with claim 22 wherein means are provided on the armature for coupling with cruise control of the model vehicle.

31. The invention in accordance with claim 22 wherein a slip ring is mounted on the armature for coupling with brush means on the column for bringing electrical current from the vehicle to the horn and cruise control of the vehicle.

32. The invention in accordance with claim 22 wherein means are provided on the mounting means for arming a sensor in the inflator upon turning the inflator to its properly mounted position.

33. A retrofit steering wheel assembly having an air bag assembly for replacing a steering wheel assembly of a vehicle without an air bag assembly comprising:

an armature including a casting possessing a periphery defining the general outline of a steering wheel and about which a cover is added to form the wheel, means for coupling with a steering wheel column;

a mounting means coupled with the casting and adapted to mount an inflator, the mounting means having a hole therein adapted to receive a pin of an air bag module, the mounting means defining with the casting an opening through which surfaces of the inflator are adapted to travel while mounting the inflator;

a biased arm biased to a closed position closing the hole and operating to prevent the pin of the air bag module to penetrate through the hole when the inflator is other than properly mounted in the mounting means and adapted to be moved to an open position at which the pin is adapted to penetrate the hole only when the inflator is properly mounted;

an inflator having a radially extending lug and means for coupling the inflator to the mounting means when the inflator is properly mounted, the arm defining the surfaces that travel through the opening track, the radially extending lug on the inflator being adapted to engage the biased arm to move the arm from a closed position to an open position during said travel to place the inflator in a properly mounted position and to permit the pin to penetrate the hole to anchor the inflator in its properly mounted position.

* * * * *